(12) United States Patent
Oleksiewicz

(10) Patent No.: US 6,178,748 B1
(45) Date of Patent: Jan. 30, 2001

(54) ALTITUDE COMPENSATING WASTEGATE CONTROL SYSTEM FOR A TURBOCHARGER

(75) Inventor: Radek A. Oleksiewicz, Riverwoods, IL (US)

(73) Assignee: Navistar International Transportation Corp., Chicago, IL (US)

( * ) Notice: Under 35 U.S.C. 154(b), the term of this patent shall be extended for 0 days.

(21) Appl. No.: 09/122,021

(22) Filed: Jul. 24, 1998

(51) Int. Cl.$^7$ .................................................. F02D 23/00
(52) U.S. Cl. ............................................................ 60/602
(58) Field of Search .................................................. 60/602

(56) References Cited

U.S. PATENT DOCUMENTS

| | | |
|---|---|---|
| 3,195,805 | 7/1965 | Cholvin et al. . |
| 4,283,912 * | 8/1981 | Cholvin .................................. 60/602 |
| 4,442,672 * | 4/1984 | Fischer .................................. 60/602 |
| 4,468,928 * | 9/1984 | Suzuki .................................. 60/602 |
| 4,476,682 * | 10/1984 | McInerney ............................. 60/602 |
| 4,492,519 | 1/1985 | Owen et al. . |
| 4,703,625 * | 11/1987 | Caldwell .................................. 60/602 |
| 4,790,139 | 12/1988 | Roach . |
| 4,848,086 | 7/1989 | Inoue et al. . |
| 5,036,663 | 8/1991 | Akagi et al. . |
| 5,755,101 * | 5/1998 | Free et al. ................................. 60/602 |

* cited by examiner

*Primary Examiner*—Noah P. Kamen
(74) *Attorney, Agent, or Firm*—Jeffrey P. Calfa; Dennis Kelly Sullivan; Gilberto Hernandez

(57) ABSTRACT

An altitude compensating turbocharger wastegate control system operates by bleeding air from an intake air line extending from an intake manifold of an engine to a wastegate actuator to raise the intake manifold pressure at which the wastegate is opened when the engine is operating at high altitudes. The control system operates in response to a comparison of barometric air pressure sensed by a pressure sensor and a number of predefined ranges of sensed pressure in a memory of an engine controller to determine whether no, full, or an intermediate amount of bleeding should take place in order to maintain the desired turbocharger output at high altitudes.

8 Claims, 1 Drawing Sheet

| STATE | SENSOR OUTPUT | VALVE A | VALVE B | WASTEGATE ACTUATOR PRESSURE BLEEDING THROUGH |
|---|---|---|---|---|
| 1 | P<REFL. | CLOSED | CLOSED | NONE |
| 2 | REFL.<P<REFM | OPEN | CLOSED | ORIFICE A |
| 3 | REFM.<P<REFH | CLOSED | OPEN | ORIFICE B |
| 4 | P>REFH | OPEN | OPEN | ORIFICE A&B |

/ # ALTITUDE COMPENSATING WASTEGATE CONTROL SYSTEM FOR A TURBOCHARGER

BACKGROUND OF THE INVENTION

The present invention relates to an altitude compensating wastegate control system for a turbocharger which automatically compensates for decreased air density and barometric pressure at high altitudes by bleeding off, in preselected steps, the pressure in an air line supplying intake manifold pressure to an actuator of the turbocharger wastegate, thereby raising the intake manifold pressure level required before the wastegate of the turbocharger opens. The preselected steps are selected by the control system in response to sensed barometric pressure to produce different bleed configurations without requiring a dedicated feedback circuit.

THE PRIOR ART

Although the intake manifold pressure requirements of a turbocharged engine are fairly constant across the engine speed range at full load, the output pressure is highly dependent on engine speed because the compressor of the turbocharger is driven by a turbine powered by flow from the exhaust manifold. Inasmuch as a turbocharger must produce an adequate manifold pressure in the engine at lower speeds, a turbocharger wastegate is used to maintain an upper limit on intake manifold pressure of the engine at higher engine speeds by bypassing a portion of the exhaust flow around the turbocharger turbine to avoid engine damage due to excessive cylinder pressure. Operation of the wastegate is controlled by a spring controlled actuator which is fed pressurized air from the intake manifold, so that pressurized air fed to the actuator will cause the normally-closed wastegate to open as the spring force is overcome.

However, the low altitude parameters for controlling wastegate operation are not desirable for controlling engines at higher altitudes, where air density is lower because there will be less oxygen per piston stroke available for combustion resulting in less power and poor combustion. In fact, higher intake manifold pressure and increased mass air flow are desirable.

Previously, various altitude compensation systems for controlling turbocharger wastegate operation at high altitudes have been taught. Such systems are disclosed, for example, in U.S. Pat. Nos. 3,195,805, 4,476,682, 4,492,519, 4,790,139, 4,848,086, and 5,036,663.

As an example, U.S. Pat. No. 4,476,682 includes a bleed valve comprising an evacuated bellows exposed to atmospheric pressure and located in an intake manifold pressure sensing line. The bellows expands as altitude increases and releases pressure from the sensing line to atmosphere, reducing pressure in the sensing line and, thereby raising the intake manifold pressure at which the wastegate opens so that turbocharger operation does not decrease.

The electronic systems disclosed in the other references require feedback for operation, requiring the presence of a separate circuit and/or sensor for providing such feedback.

SUMMARY OF THE INVENTION

Accordingly, it is a primary object of the invention to provide an altitude compensating wastegate control system for a turbocharger that does not require feedback or a separate circuit and/or sensor.

This object, as well as others, is met by the wastegate actuator control system of the present invention which utilizes available input from a barometric pressure sensor for operating a bleed-off valve system associated with the air supply line from the intake manifold which controls the operation of the wastegate actuator. The control system conFIG.s the bleed-off valve system in one of a plurality of predefined stepped settings, to compensate for altitude effects, the altitude being derived from sensed barometric air pressure.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figures 1, 2:
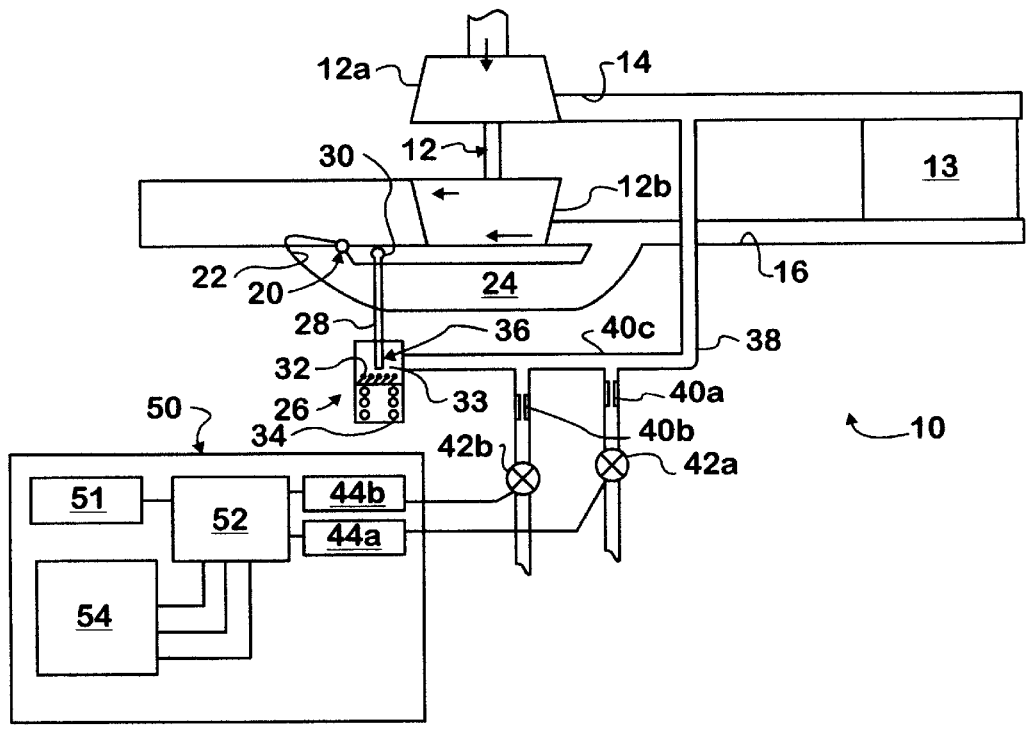
FIG. 1 is a schematic diagram of a turbocharged engine incorporating the altitude compensating wastegate control system for a turbocharger made according to the teachings of the present invention.
FIG. 2 is a chart defining a plurality of predefined settings for the wastegate control system of FIG. 1.

Referring now to FIG. 1 in greater detail, there is illustrated therein a simplified diagram of an altitude compensating wastegate control system for a turbocharger generally identified by reference numeral 10 made in accordance with the present invention.

As is known in the engine art, a turbocharger 12 for a diesel engine 13 comprises a compressor 12a engaged with an intake air manifold 14 and a turbine 12b engaged with an exhaust air manifold 16 of the engine 13. The turbine 12b is driven by exhaust gas flow and is connected to the compressor 12a so that the compressor 12a is driven to provide a larger volume of pressurized air flow to the engine 13, as required for optimum engine operation. The supply of pressurized air from the turbocharger 12 must be controllable to accommodate various engine operating conditions from low speed and low load conditions, involving low exhaust and low intake air flow, to high speed, high load conditions, involving high exhaust and high intake air flow.

Conventionally, a wastegate 20, generally incorporated as part of the turbocharger 12, may be positioned across an outlet 22 of an exhaust bypass 24 which branches off the exhaust passage 16 at a point upstream of the turbine 12b. The wastegate 20 is normally closed but is actuated at high intake manifold pressures, as necessary, to siphon off air fed to the turbocharger 12 to avoid excessive intake manifold pressure in the engine 13 which can cause adverse effects on the engine by increasing the peak cylinder pressure.

One of the variables affecting the operation of engine 13 is the altitude at which the engine 13 is operating. The altitude affects the barometric pressure and the air density and, as the pressure and density decrease, there must be compensation to optimize the operation of engine 13 by increasing the amount of turbocharging so that a sufficient amount of air flow will be present to ensure adequate combustion and delivery of the desired engine power.

To compensate for the decreased air density and barometric pressure at higher altitudes and to maintain an optimum flow of air from the turbocharger 12 to the engine 13, the wastegate 20 must remain closed until a higher intake manifold pressure is attained. In the control system 10 of the present invention, this is accomplished by decreasing the flow of pressurized intake air to an actuator 26 of the wastegate 20.

It will be understood that, in this embodiment, the actuator 26 includes a rod 28 that mechanically engages the wastegate 20 at one end 30 and engages a diaphragm 32 extending across the actuator 26 at another end 33 thereof. The diaphragm 32 is spring-biased toward the wastegate 20 in a manner such that extension of a biasing spring 34 maintains the wastegate 20 closed.

Extension of the biasing spring 34 is controlled by the intake manifold air pressure that is conducted into an opposing air chamber 36, within actuator 26 to oppose the force of the spring 34. The air is supplied to the chamber 36 via an air line 38 connecting to the intake air manifold 14 at a position downstream of the turbocharger 12. When the intake air pressure in line 38 is low, the wastegate 20 is closed by spring 34 and all of the exhaust gas within the exhaust manifold 16 is used to drive the turbine 12b of the turbocharger 12.

When the intake manifold pressure is sufficiently high to overcome the opposing force of the spring 34, the wastegate 20 is opened, allowing a portion of the exhaust flow to bypass the turbine 12b of the turbocharger 12, slowing the operation the compressor 12a and decreasing the pressure and flow of air to the intake manifold of the engine 13 and to the air line 38.

To provide altitude compensation, the control system 10 of the invention provides at least two bleed lines 40a and 40b, each having a respective valve 42a, 42b therein, for serially bleeding off the pressure in intake air line 38 into the ambient environment. The bleed lines are configured so that the first upstream bleed line 40a has an orifice diameter smaller than that of an orifice 40c in the intake air line 38 and so that the second, downstream bleed line 40b has an orifice diameter smaller than that in the upstream bleed line 40a.

It will be understood that the intake air line 38 branches off the intake air manifold 14 at a point downstream of the turbocharger 12 and thus the line 38 carries pressurized air exiting the turbocharger 12, and that the turbocharger 12 is working harder at such high altitude. Because of a false high pressure created in the intake air line 38 by the increase in turbocharger 12 output, if no bleed of the actuator air line 38 were possible, the wastegate 20 would open, decreasing turbocharger output to the engine 13 with an inherent loss of power and efficiency thereof.

Each valve 42a and 42b is controlled by an electronic driver 44a and 44b, respectively, with the actuation of each driver 44 being controlled by an engine control module 50 that processes a barometric pressure signal from a pressure sensor 51 and which incorporates a comparator 52 and a memory 54. The memory 54 includes therein predetermined, specific parameters for defining reference pressures for low, medium, and high altitude operation of the wastegate control system 10.

Thus, the logic of the comparator 52 can access the baseline reference parameters, determine altitude as a function of sensed barometric pressure and, based on these values, can compare these sensed values to predefined values of operational parameters for the system 10 stored in memory 54 and determine whether bleeding of the pressure in the air line 38 is required, and, if so, what degree of bleeding is required. If bleeding is required, the valves 42a and 42b are opened, singly or in combination, to provide the appropriate degree of bleeding, all without feedback from the engine sensors.

Turning now to the chart 100 of FIG. 2, it will be seen that the memory 44, in the present embodiment includes parameters for four possible state settings.

State 1 exists when the sensed barometric pressure is less than that defined in the memory 54 as the reference low altitude pressure. In this state, since the air pressure indicates that the engine 13 is operating at low altitude, the valves 42 in the bleed lines 40 are maintained closed, with no bleeding taking place. Thus, all air in the intake line 38 is fed to the wastegate actuator chamber 36, and the wastegate 20 is operational.

State 2 exists when the sensed barometric pressure is above the reference low altitude pressure but below a reference medium altitude pressure in the stored memory 54. In this state, a small degree of bleed would be required to raise the intake manifold pressure at which the wastegate 20 opens and thereby compensate the engine to provide similar air flow from the turbocharger 12 as at low altitude. To provide such small degree of bleed, the comparator 52 would activate the driver 44a for valve 42a, allowing bleeding of air through the smallest orifice 40a available.

State 3 exists when the sensed barometric pressure is above that defined as a reference medium altitude pressure in the stored memory 54. Here, a slightly greater degree of bleed is required and the comparator 52 activates the driver 44b for valve 42b, allowing bleeding through the next larger orifice 40b available.

State 4 exists when sensed barometric pressure is above the reference high altitude pressure in the stored memory 54. Here, a maximum amount of bleed would be required to keep the wastegate 20 closed until a higher manifold pressure is obtained, and both valves 42a and 42b would be opened.

As described above, the present invention provides a number of advantages, some of which have been described above and others of which are inherent in the invention. Also, modifications may be proposed without departing from the inventive teachings herein. Accordingly, the scope of the invention is only to be limited as required by the accompanying claims.

What is claimed is:

1. Apparatus for compensating a control system for a turbocharger wastegate for an engine, said wastegate being biased to a normally-closed position, said control system including an air passage extending from an intake manifold of said engine to the wastegate, said air passage communicating pressurized air acting against said bias to open said valve, comprising a bleed passage having an effective flow area in venting relationship with said air passage to reduce the pressure therein, the bleed passage having an electronically-controlled valve therein which opens in response to a control signal thereto from an engine control module, the engine control module having a comparator and a memory therein including a predefined range of barometric pressure and being operatively associated with a barometric pressure sensor, said engine control module providing said control signal to the bleed valve upon the sensed barometric pressure being within the predefined range of barometric pressure.

2. The system of claim 1 wherein said bleed passage incorporates a bleed orifice therein.

3. The apparatus of claim 1 further comprising a second bleed passage in venting relationship with said air passage, said second bleed passage having an effective flow area of a different size than said first bleed passage and incorporating a second valve therein which opens in response to a second control signal thereto from an engine control module, and said control module memory including multiple ranges of predefined barometric pressures.

4. The system of claim 3 wherein each electronically-controlled valve is actuated in response to a control logic incorporated in said engine control module programmed in a predetermined stepwise manner to send a control signal to at least one of said control valves in response to said sensed barometric pressure falling within one of said multiple ranges of predefined barometric pressures.

5. The system of claim 2 wherein each electronically-controlled valve is actuated in response to a control logic incorporated in said engine control module programmed to send a control signal to at least one of said control valves in response to said sensed barometric pressure falling within one of several mutually exclusive ranges of air pressure sensed in a predefined manner.

6. The system of claim 5 wherein each range sensed produces actuation of a particular combination of bleed line valves.

7. The system of claim 5 wherein a first low range sensing provides no control valve actuation.

8. The system of claim 7 wherein a second high range sensing provides simultaneous actuation of all valves.

* * * * *